(Model.)
G. B. ST. JOHN.
ESCAPEMENT.
No. 313,962. Patented Mar. 17, 1885.
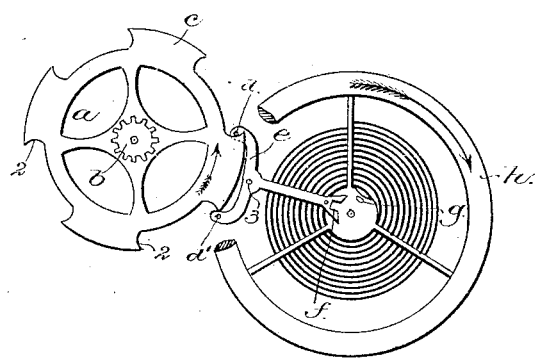
Witnesses.
John F. C. Prinkert
Henry Marsh
Inventor.
George B. St. John.
by Crosby & Gregory attys

UNITED STATES PATENT OFFICE.

GEORGE B. ST. JOHN, OF BOSTON, MASSACHUSETTS.

ESCAPEMENT.

SPECIFICATION forming part of Letters Patent No. 313,962, dated March 17, 1885.

Application filed January 3, 1884. (Model.)

*To all whom it may concern:*

Be it known that I, GEORGE B. ST. JOHN, of Boston, county of Suffolk, State of Massachusetts, have invented an Improvement in Escapements, of which the following description, in connection with the accompanying drawing, is a specification, like letters on the drawing representing like parts.

My invention relates to an escapement especially intended for watches of that class known as "timers" or "stop-watches," the escape-wheel being intended to have a hand or pointer connected with its arbor, which will make a complete rotation in one or two seconds, indicating on its dial each vibration of the balance, so that when the watch is stopped it will indicate the time to the nearest fractional part of a second that is occupied by each vibration of the balance. The periphery of the escape-wheel is made with a series of wide teeth or projecting portions, preferably four in number, when the balance is intended to beat four times a second, as is usual, and the forward sides or faces of the said teeth or projections alternately engage the pallets of the lever, which co-operates with the balance in the usual manner. The ends of the teeth of the escape-wheel are concentric with the axis of the wheel, and during the rotation of the wheel serve as a stop for the pallet from which the tooth has last escaped, preventing the movement of the escapement-lever while the wheel is turning. The sides of the teeth or the pallets, or both, may be shaped to give the necessary impulse to the balance as the teeth escape.

The drawing shows in plan view a portion of an escapement embodying this invention.

The escape-wheel $a$, provided with a pinion, $b$, impelled by the usual train, with a tendency to rotate in the direction of the arrow, is provided with a series of teeth or projections, $c$, the ends of which are concentric with the arbor of the said wheel $a$. The forward sides, 2, of the said teeth engage and are stopped by the pallets $d$ $d'$ of the escapement-lever $e$, pivoted at 3, the said pallets in this instance consisting of cylindrical pins extending up to the level of the teeth of the wheel $a$. The lever $e$ is provided with the usual fork or notch, $f$, which co-operates with the pin $g$ of the balance $h$, which is shown as having just completed a vibration in the direction of the arrow. When the balance makes its return movement, the pin $g$, entering the notch $f$, will swing the lever $e$ on its pivot, disengaging the pallet $d$ from the tooth, and at the same time moving the pallet $d'$ into the space between the teeth, so that it will lie in the path of the next tooth, ready to arrest the wheel when the forward side of the said tooth strikes it, the wheel making one-eighth of a revolution between its successive engagements by the pallets. It will be seen that when the pallet $d$ is removed from the forward side of the teeth engaged by it the said tooth, owing to the round shape of the pin, will give a slight impulse to the lever; and, furthermore, the convex end of the tooth or projecting portion of the wheel will, during the rotation of the wheel, lie in the path of the pin $d$, preventing the return movement of the lever $e$ before the next vibration of the balance.

I am aware that an escapement has been previously made in which an escape-wheel provided with pins co-operated with a lever having shoulder-like pallets, and I do not broadly claim an escapement in which pins co-operate with shoulders to arrest the wheel; but in such previous escapement the wheel and pallets did not co-operate together during the rotary movement of the wheel to lock the lever or prevent its return movement.

I claim—

1. In an escapement for wheel-work, the lever provided with pallets, combined with an escape-wheel provided with wide teeth or projecting portions having convex ends, the sides of which teeth are engaged by the said pallets, which thus arrest the wheel, and the convex end of the said teeth co-operating with each of the said pallets during the rotary movement of the wheel after a tooth has escaped therefrom, substantially as described.

2. In an escapement, the escape-wheel having wide teeth, the ends of which are concentric with the arbor of the wheel, combined with the vibrating lever provided with pallets consisting of cylindrical pins, substantially as and for the purpose described.

In testimony whereof I have signed my name to this specification in the presence of two subscribing witnesses.

GEORGE B. ST. JOHN.

Witnesses:
JOS. P. LIVERMORE,
W. H. SIGSTON.